US009636273B1

(12) United States Patent
Harris

(10) Patent No.: US 9,636,273 B1
(45) Date of Patent: May 2, 2017

(54) DRUG MONITORING METHODS AND SYSTEMS

(75) Inventor: James Wayne Harris, Grapevine, TX (US)

(73) Assignee: Vatex Explorations, LLC, Barrington, IL (US)

(*) Notice: Subject to any disclaimer, the term of this patent is extended or adjusted under 35 U.S.C. 154(b) by 108 days.

(21) Appl. No.: 13/312,956

(22) Filed: Dec. 6, 2011

Related U.S. Application Data

(60) Provisional application No. 61/459,035, filed on Dec. 6, 2010.

(51) Int. Cl.

| | |
|---|---|
| ***G06F 17/00*** | (2006.01) |
| ***A61J 1/00*** | (2006.01) |
| *A61J 7/00* | (2006.01) |

(52) U.S. Cl.
CPC ... *A61J 1/00* (2013.01); *A61J 7/00* (2013.01)

(58) Field of Classification Search
CPC .................................... A61J 1/00; A61J 7/00
USPC .................................................. 700/236, 244
See application file for complete search history.

(56) References Cited

U.S. PATENT DOCUMENTS 6,304,797 B1* 10/2001 Shusterman .................. 700/243
6,471,087 B1* 10/2002 Shusterman ...................... 221/2
6,842,736 B1 1/2005 Brzozowski
7,126,879 B2 10/2006 Snyder
7,537,005 B2 5/2009 Dave
7,668,730 B2 2/2010 Reardon et al.
7,765,106 B2 7/2010 Reardon et al.
7,801,745 B2* 9/2010 Walker et al. .................... 705/2
7,885,725 B2* 2/2011 Dunn ............................ 700/237
8,326,455 B2* 12/2012 Dunn ............................ 700/237
2006/0157491 A1 7/2006 Whittle et al.
2007/0135691 A1* 6/2007 Zingelewicz et al. ........ 600/301
2007/0135790 A1* 6/2007 Auerbach ..................... 604/500
2007/0156282 A1* 7/2007 Dunn ............................ 700/244
2007/0186923 A1 8/2007 Poutiatine et al.
2007/0260491 A1 11/2007 Palmer et al.
2008/0071421 A1* 3/2008 Silverbrook et al. ......... 700/231
2008/0151695 A1* 6/2008 Kimel et al. .................... 368/10
2008/0300719 A1* 12/2008 Duke ................... A61J 7/0481
700/244
2008/0300902 A1 12/2008 Smith et al.
2010/0318218 A1* 12/2010 Muncy, Jr. .......... G06F 19/3462
700/220
2011/0112686 A1* 5/2011 Nolan et al. ................. 700/244
2011/0119085 A1 5/2011 Reardon et al.
(Continued)

*Primary Examiner* — Michael K Collins
(74) *Attorney, Agent, or Firm* — Richards Patent Law P.C.

(57) ABSTRACT

A medication-tracking device includes: a storage mechanism adapted to securely store a plurality of doses of a medication; a dose distribution mechanism adapted to dispense a dose of the medication; a time identification mechanism adapted to identify the time for which the dose distribution mechanism dispenses a dose of the medication; an absolute location identification mechanism adapted to identify the absolute location at which the dose distribution mechanism dispenses a dose of the medication; and a communication mechanism adapted to report the time and absolute location information identified by the time and absolute location identification mechanisms. A medication-tracking system may include a medication tracking device, an associated device, and a central system, wherein the central system collects and analyzes the data.

14 Claims, 1 Drawing Sheet

(56) References Cited

U.S. PATENT DOCUMENTS

| | | | | |
|---|---|---|---|---|
| 2011/0125318 | A1* | 5/2011 | Dunn | 700/237 |
| 2011/0161108 | A1 | 6/2011 | Miller et al. | |
| 2012/0035760 | A1* | 2/2012 | Portney | G06F 19/3462 700/231 |
| 2012/0130534 | A1* | 5/2012 | Wurm | 700/236 |

* cited by examiner

DRUG MONITORING METHODS AND SYSTEMS

CROSS-REFERENCE TO RELATED APPLICATIONS

This application incorporates by reference and claims priority to U.S. Provisional Patent Application No. 61/459,035 filed Dec. 6, 2010.

BACKGROUND OF THE INVENTION

The illicit use of prescription drugs has become a major healthcare problem. In the US in 2002, six million individuals were estimated to have used prescription drugs for non-medical purposes. Eleven percent of all US prescriptions are for the most high-risk form of medications, known as Controlled Substances. The cost to the healthcare system of prescription drug abuse and diversion was estimated to be $100 billion in the US in 2001.

Drugs are obtained illicitly through a variety of means including drug theft, illegal Internet shopping, prescription forgery, illegal prescriptions from physicians and doctor shopping. The most common drugs diverted include opiates (particularly hydrocodone, oxycodone, fentanyl and methadone), tranquilizers (diazepam and alprazolam), stimulants such as methylphenidate and sedatives. The diversion of pain medications is one of the most severe healthcare problems, with the addictive nature of the drugs causing enormous challenges to users and their families. The incentive for fraud and diversion is very significant. For example, a Medicaid patient can obtain 100 80-mg pills of OxyContin for $30 with a street re-sale price of $8,000.

The magnitude of the diversion of medications for pain, anxiety, and learning disorders, often from the highly-scrutinized Controlled Substances category, has resulted in the disruption of normal doctor-patient trust and interactions. In accord with The Federation of State Medical Boards guidance, a doctor will routinely require a new patient to sign a contract prior to providing a Controlled Substance prescription. The terms of the contract will often include a stipulation for the patient to be subjected to random blood or urine drug testing in order to monitor the individuals' compliance with the medication regimen.

A drug testing industry has developed to support this management approach. The extent of the diversion problem is highlighted from data generated in such programs. In one study, drug monitoring indicated that more than 70% of patients were out of compliance with their regimen and 39% had the prescribed drug or metabolites completely absent. Because internet-savvy drug users and organized criminals understand the pharmacokinetic basis of the testing, the tests can be used to feign compliance and hence further manipulate the prescriber.

Considerable resources and expenditures have been invested in attempts to reduce the diversion problem. Drug developers have attempted to make pain medications more challenging to illicit users by the development of sustained release forms, pro-drugs, and alternative modes of administration such as dermal patches instead of pills. However, the resourcefulness of illicit drug users and supplier organizations has generally overcome these impediments.

The use of electronic monitoring systems to combat the problem generally has been limited to methods to track prescription patterns in order to flag unusual prescription volume by a doctor or multiple prescriptions sought by an individual from multiple doctors. However, these solutions are circumvented by organized criminals and, hence, only address a portion of the problem. Previously, there have not been any solutions that enable the robust tracking of drugs after they have been provided to the prescribed end-user, nor have there been systems and methods that enable authorities to differentiate between normal patient behaviors and criminal activities.

Accordingly, there is a need for a system and method to enable the tracking of dosage forms after they have been provided to the legal end-user and enable a robust assessment of patient compliance with prescribed drug regimens.

SUMMARY OF THE INVENTION

The needs described above, and others, are met by the solutions provided herein. The present subject matter discloses systems and methods by which the distribution of drugs, patient use patterns, and similar metrics may be monitored after a prescription has been filled and the drugs have been provided to a user. Specifically, the presently disclosed systems and methods enable the monitoring of the time and absolute location of drug dose-taking events. Further, optionally, the present subject matter provides systems and methods in which the proximity of the prescribed user to the distributed drugs may be monitored at the time of usage. The systems and methods also enable the monitoring of patient compliance with prescribed drug regimens.

In one example, painkillers or other medications may be assembled in a tamper-evident housing with individual doses packaged and connected to a sensor that records and transmits the time and absolute location of the dispensing of each dose to a central processor (directly or indirectly). The housing may be designed to hold any type of drug presentation, including, for example, pills, capsules, dermal patches and pre-filled syringes.

The patient may optionally wear an electronic device, such as a tamper-proof bracelet with GPS, RFID, or similar location-designating capability, which is also in communication with the central processor (again, directly or indirectly). The location of the user at the time of access to the medication may further or alternatively be tracked by incorporating a biometric identification mechanism, such as a fingerprint reader, into the medication dispensing housing or the associated device.

The housing and associated electronic device may collect data and communicate to the processor using various forms of data collection and communication protocols over any form of wireless or wired communication method. The housing and other electronic device may be connected to a data network or may be connected to an intermediary device that is in turn connected to a data network. Data may be communicated in real time, on a scheduled basis, or upon connection to a network.

As the patient removes the medication doses from the individual compartments, both the absolute location and time of dosing events are communicated to the processor. Accordingly, data is generated and communicated that links the absolute location of the drug access and, optionally, the proximity of the patient, to the time and frequency of access to the medication.

Behavioral algorithms may be employed to assess whether the drugs are being used in a compliant manner and to identify users who are accessing the drugs too frequently, who are accessing the medications from absolute locations that do not meet acceptance criteria, or who are physically remote from the drugs when the dose is accessed. Analysis of the pattern of use and additionally the return of and condition of the device, may be used to make judgments on the diversion risk from the individual resulting in initiatives to recommend counseling or to terminate prescriptions for individuals clearly violating defined medical procedures.

The following is an example of the systems and methods described herein, put into use. A doctor writes a prescription for thirty transdermal patches. A pharmacy fills the order by sealing the transdermal patches in a multi-compartment disposable plastic tray. For example, the medication may be sealed within the tray using heat seals, ultrasonic welding, etc. The patient can then access each individual patch by opening/piercing/etc. one or a plurality of compartments within the tray. The absolute location and time of this act is determined and recorded. Accordingly, the patient is free to open as many or as few compartments as are needed for therapy.

The absolute location and time of the access are monitored and analyzed by a processor, for example a processor in a central system adapted to monitor the activity of a large number of dispensed prescriptions. The software may identify patient behavior patterns deemed to be inconsistent with lawful compliance to the prescribed regimen as identified by analysis of the collected data. The data analysis may then be used to propose management solutions to ensure patient compliance. For example, minor deviations from expected behavior may necessitate counseling, whereas dramatic deviations from expected behavior may result in the blocking of additional prescriptions. Further, the physical condition of the medication-tracking device itself may be used to monitor and analyze the mode of access to the prescribed material. For example, the medication-tracking device may be required to be returned to the prescriber, pharmacy, or monitoring company for anti-tampering inspection. Repeated deviations from acceptable use of the medication-tracking device may result in the blocking of additional prescribing.

In another example, the advantages of the systems and methods provided herein may be achieved using a factory-assembled tray, rather than a tray assembled by a pharmacist. However, given the various drugs, manufacturers, and drug combinations available, the pharmacy-assembled embodiment may be the most flexible.

In a preferred embodiment, a medication-tracking device includes: a storage mechanism adapted to securely store a plurality of doses of a medication; a dose distribution mechanism adapted to dispense a dose of the medication; a time identification mechanism adapted to identify the time for which the dose distribution mechanism dispenses a dose of the medication; an absolute location identification mechanism adapted to identify the absolute location at which the dose distribution mechanism dispenses a dose of the medication; and a communication mechanism adapted to report the time and absolute location information identified by the time and absolute location identification mechanisms.

In some embodiments, the time and location of any access to the storage mechanism is reported to a central processor by the communication mechanism. In such embodiments, the central processor may use behavioral algorithms to analyze the reported time and location information. The results of the analysis using behavioral algorithms are used to suggest one of a plurality of management solutions, such as to initiate medication-use counseling and/or blocking further prescriptions to a patient associated with the medication-tracking device.

In another preferred embodiment, a medication-tracking system includes a medication-tracking device including: a storage mechanism adapted to securely store a plurality of doses of a medication; a dose distribution mechanism adapted to dispense a dose of the medication; a time identification mechanism adapted to identify the time for which the dose distribution mechanism dispenses a dose of the medication; an absolute location identification mechanism adapted to identify the absolute location at which the dose distribution mechanism dispenses a dose of the medication; and a communication mechanism adapted to report the time and absolute location information identified by the time and absolute location identification mechanisms; and a central processor, wherein the central processor receives the time and absolute location information reported by the medication-tracking device.

In some embodiments, the medication-tracking system further includes an associated device, which is adapted to communicate its position to either the medication-tracking device or the central processor. For example, the associated device may be a smartphone, a location aware bracelet, or similar personal associated device. The central processor may identify the distance between the medication-tracking device and the associated device at the time of each dose distribution. The medication-tracking device may further include a biometric identification mechanism, such as a fingerprint reader. In addition, or alternatively, the associated device may include a biometric identification mechanism. The system may include a plurality of medication-tracking devices each associated with a unique corresponding associated device.

In some examples, a method of tracking medication distribution after the filling of a prescription includes the steps of: providing a medication-tracking device for distribution of the prescribed medication; receiving data regarding the time and the absolute location a user accessed the prescribed medication from the medication-tracking device; and analyzing the data received regarding the time and absolute location a user accessed the prescribed medication to determine the likelihood of drug diversion. The methods may further include using the results of the analysis to determine what further actions to take with respect to the prescribed user (e.g., counseling, blocking further prescriptions, etc.). The methods may further include the implementation of an associated device, which enables the location of the prescribed user to be determined and tracked at the time the prescribed medication is accessed from the medication-tracking device.

An advantage of the subject matter presented herein is it enables the monitoring of the time and absolute location of the access to prescribed medication.

Another advantage of the subject matter presented herein is it enables the monitoring of the location of the patient relative to the medication access location.

A further advantage of the subject matter presented herein is that the systems and methods provided herein do not restrict the patient's access to the medication.

Yet another advantage of the subject matter presented herein is the data collected by the system may be used to identify behavior patterns deemed to be inconsistent with lawful compliance to the prescribed regimen.

Still another advantage of the subject matter presented herein is the data collected by the system may be used to differentiate between authentic patients and professional diverters.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

It should be noted that various changes and modifications to the presently preferred embodiments described herein will be apparent to those skilled in the art. Such changes and modifications may be made without departing from the spirit and scope of the present invention and without diminishing its attendant advantages.

DETAILED DESCRIPTION OF THE INVENTION

Figure 1:
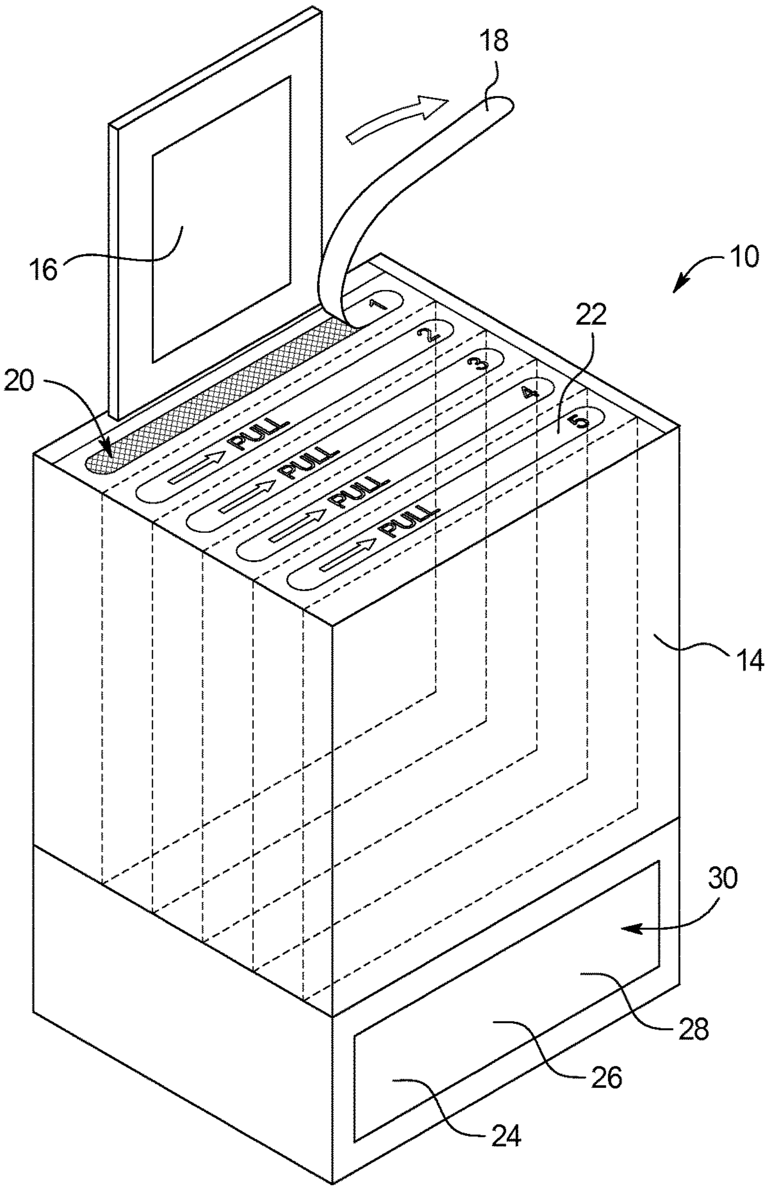
FIG. 1 is an example of a medication-tracking device.

Referring now to the drawings and particularly to FIG. 1, an example of a medication-tracking device 10 is shown. In the example shown, the medication-tracking device 10 is embodied in the form of a multi-compartment tray 12. However, it is contemplated that the medication-tracking device 10 may be in any of numerous forms, including trays, pouches, packs, compartments, etc.

The medication-tracking device 10 shown in FIG. 1 includes a storage mechanism 14 adapted to securely store a plurality of doses of a medication 16, each of which may be accessed individually via a dose distribution mechanism 18. In the example shown, the storage mechanism 14 is provided in the form of a plurality of individually accessible compartments 20 within the disposable plastic tray 12. The dose distribution mechanism 18 is embodied in tamper-evident closures 22, each of which covers and seals a corresponding compartment 20.

As shown, the individually accessible compartments 20 may be sealed with status-aware, tamper-evident closures 22 that may be separately opened and accessed by a user. Each compartment 20 may include a single dose of the medication 16. In this example, each compartment 20 holds a single transdermal patch 16. In other embodiments, other medications 16 or medication combinations meant to be dosed at one time (i.e., a multi-drug regimen) may be used, whether in the form of pills, patches, caps, gels, creams, ointments, fluids, injections, etc. The form of the medication-tracking device 10, the storage mechanism 14, and dose distribution mechanism 18 may be adapted to more appropriately correspond to the form of the medication 16. For example, when the medication 16 is in the form of pills, the medication-tracking device 10, and particularly the compartments 20, may be more specifically tailored to store and dispense single or prescribed doses of the pills.

In another example, the entirety of the prescribed medication 16 may be stored in a single storage mechanism 14, rather than individual compartments, and the dose distribution mechanism 18 may limit the user's access to a single dose of the medication 16 at a given time. For example, the medication 16 may be a cream, the storage mechanism 14 may hold all of the prescribed medication 16 and the dose distribution mechanism 18 may be a regulated pump for dispensing a single dose of the cream at a given point in time. Similarly, an automated mechanism may be employed as the dose distribution mechanism 18 that measures out the appropriate quantity of medication 16 for distribution in response to a user action to dispense the medication 16.

The medication-tracking device 10 shown in FIG. 1 further includes a time identification mechanism 24 adapted to identify the time for which the dose distribution mechanism 18 dispenses a dose of the medication 16. In addition, the medication-tracking device 10 shown in FIG. 1 includes an absolute location identification mechanism 26 adapted to identify the absolute location at which the dose distribution mechanism 18 dispenses a dose of the medication 16. The medication-tracking device 10 also includes a communication mechanism 28 adapted to report the time and absolute location information identified by the time identification mechanism 24 and the absolute location identification mechanism 26. As described further herein, the time identification mechanism 24, absolute location identification mechanism 26, and communication mechanism 28 may be embodied in a controller 30.

The controller 30 may run a variety of programs, access, and store data, including accessing and storing data in associated databases (for example, one or more databases associated with central system 32, as described further herein), and may further enable one or more interactions with any user interface provided. For example, the medication-tracking device 10 may mate with a corresponding device or connect to a network at a pharmacy, clinic, facility, or patient home to transfer data, allow access for programming/reprogramming, etc. Such mating may include the transfer of information through a communication protocol, whether through physical or wireless connection and whether direct or through one or more intermediary devices.

Typically, the controller 30 may be embodied in one or more programmable data processing devices. For example, the controller 30 may be a conventional microprocessor, memory (e.g., DRAM, PROM, EPROM, EEPROM, etc.), and one or more input/output interface for communications with one or more additional systems. The hardware elements, operating systems, and programming languages of such devices are conventional in nature, and it is presumed that those skilled in the art are familiar with controllers 30 of this nature.

As described, the time identification mechanism 24 shown in FIG. 1 is embodied in the controller 30. When a dose is accessed through the dose distribution mechanism 18, a signal is sent to the controller 30 such that the time of access may be identified and/or recorded. For example, an electronic sensor may be associated with the status-aware, tamper-evident closures 22 such that when the seal is broken, the time is recorded and/or communicated by the controller 30. Of course, it is contemplated that there are numerous triggers that may be used to trigger the recording and/or communication of the time at which a dose of the medication 16 is accessed and there are numerous elements that may be incorporated into the medication-tracking device 10 to enable the closures 22 to be status aware. It is further contemplated that while the closures 22 may be tamper-evident in a preferred embodiment, status-aware closures 22 may not also need to be tamper-evident in order to achieve the benefits of the invention provided herein.

The absolute location identification mechanism 26 shown in FIG. 1 is incorporated into the controller 30. In the example shown, the absolute location identification mechanism 26 may be a GPS receiver, or any other modality that can be used to determine the absolute location of the medication-tracking device 10. Accordingly, when a dose is accessed through the dose distribution mechanism 18, a signal is sent to the controller 30 such that the absolute location of access may be identified and/or recorded. For example, an electronic sensor may be associated with the tamper-evident closures 22 such that when the seal is broken, the absolute location is recorded and/or communicated by the controller 30. Of course, it is contemplated that there are numerous triggers that may be used to trigger the recordation and/or communication of the absolute location at which a dose of the medication 16 is accessed. Further, a GPS receiver is only one example of an absolute location identification mechanism 26 that may be used herein. Other examples include, cellular tower multilateration, near-field communication, etc.

Figure 2:
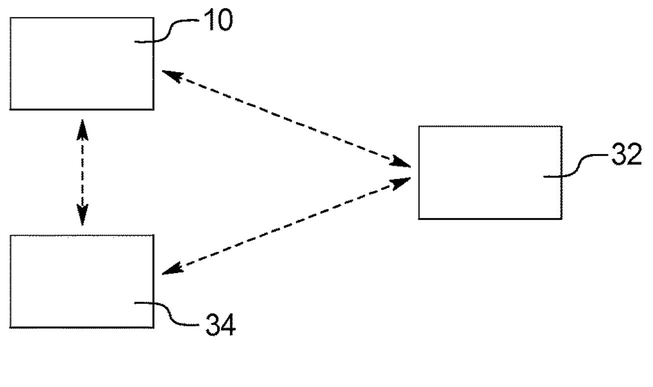
FIG. 2 is an example of a system in which the mediation-tracking device communicates with a central monitoring system.

The communication mechanism 28 shown in FIG. 1 is a cellular communication module that transmits data back to a central system 32 (shown in further detail in FIG. 2). Alternatively, the communication mechanism 28 may be a wireless communication module adapted to communicate with a wireless network. It is contemplated that the communication mechanism 28 may further be any form of communication mechanism 28, wired or wireless. For example, in one embodiment, the communication mechanism 28 may communicate with an associated device 34 (shown in FIG. 2) via Bluetooth or any other proximity-aware communication protocol, as will be described further herein.

While described as being provided in a single integrated device, the medication-tracking device 10 may be separated into constituent parts. For example, the storage mechanism 14 may include a plurality of status-aware compartments 20 which communicate with a separate device that includes, for example, the time identification mechanism 24, absolute location identification mechanism 26, and communication mechanism 28. Of course, the constituent parts may be arranged in any manner in any number of devices.

Turning now to FIG. 2, an example of a medication-tracking system 36 is shown. As shown in FIG. 2, the medication-tracking system 36 includes the medication-tracking device 10, the associated device 34, and the central system 32. In the example provided, the medication-tracking device 10 is the device 10 described above with respect to FIG. 1. The associated device 34 is a location-aware personal device, such as a smartphone, a tamper-proof bracelet with GPS, RFID, or similar absolute location-aware or proximity-aware capability, and further has the ability to communicate with the medication-tracking device 10 and/or the central system 32, either directly or indirectly. Of course, the associated device 34 may be embodied in various forms, including personal electronics, such as a smartphone running a corresponding application. Alternatively, the location of the user at the time of access to the medication 16 may further or tracked by incorporating a biometric identification mechanism, such as a fingerprint reader, into the medication-dispensing device 10 or the associated device 34.

Accordingly, the associated device 34 may be incorporated into the medication-tracking system 36 to further monitor, record, and/or communicate the absolute location of the patient (for whom the prescription was written) at the time the medication 16 is accessed. For example, in one embodiment, when a dose of the medication 16 is accessed, the medication-tracking device 10 transmits the time and absolute location of the access to the central system 32. In addition, the medication-tracking device 10 polls the associated device 34 to determine the proximity of the associated device 34 (and by extension, the prescribed patient), the proximity information further being communicated to the central system 32. This enables the medication-tracking system 36 to not only monitor the time and absolute location of the distribution of the medication 16, but also the proximity of the patient at the time the medication 16 is accessed. Of course, the central system 32, rather than the medication-tracking device 10, may poll the associated device 34 to determine the proximity of the patient each time the medication 16 is accessed.

The central system 32 may be a processing system that collects, stores, and analyses the data collected through the use of the medication-tracking system 36. The central system 32 may be adapted to monitor the activity of a large number of dispensed prescriptions. The central system 32 may flag various behavior patterns identified by analysis of the collected data. The data and analysis may then be used to design and recommend management options for the patient designed to reduce the risk of diversion. For example, minor deviations from expected behavior may necessitate counseling, whereas dramatic deviations from expected behavior may result in the blocking of additional prescriptions. Further, the medication-tracking device 10 may be used to monitor and analyze the use of the prescribed material. For example, the medication-tracking device 10 may be required to be returned to the prescriber, pharmacy, or monitoring company for anti-tampering inspection. Repeated deviations from acceptable use of the medication-tracking device 10 may result in the blocking of additional prescribing.

Aspects of the medication-tracking device 10, the medication-tracking system 36, and the methods described herein encompass hardware and software for controlling the relevant functions. Software may take the form of code, or executable instructions, for causing the controller 30 or other programmable equipment to perform the relevant steps, where the code, or instructions are carried by or otherwise embodied in a medium readable by the controller 30 or other machine. Instructions or code for implementing such operations may be in the form of computer instructions of any form (e.g., source code, object code, interpreted code, etc.) stored in or carried by any readable medium.

As used herein, terms such as computer or machine "readable medium" refer to any tangible medium that participates in providing instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A medication-tracking device comprising:

a storage mechanism adapted to securely store a plurality of doses of a medication prescribed to a patient, wherein the patient may access the entire plurality of doses of the medication without restriction as to when or where the medication may be accessed, even in a manner inconsistent with lawful compliance to a prescribed regimen;

a dose distribution mechanism adapted to dispense a dose of the medication;

a time identification mechanism adapted to identify the time for which the dose distribution mechanism dispenses a dose of the medication;

an absolute location identification mechanism adapted to identify the absolute location at which the dose distribution mechanism dispenses a dose of the medication;

a relative location identification mechanism adapted to identify the relative location of the patient with respect to the dose distribution mechanism at the time the dose distribution mechanism dispenses a dose of the medication; and a communication mechanism adapted to automatically report the time and absolute location information identified by the time and absolute location identification mechanisms to a central processor distinct from the medication-tracking device, wherein the communication mechanism and the absolute location identification mechanism are triggered to report when a dose of the medication is dispensed from the dose distribution mechanism, wherein the central processor uses behavioral algorithms to analyze the reported time and location information, wherein the behavioral algorithms are adapted to analyze the risk of drug diversion or misuse based on the reported time and location associated with each dose of medication dispensed by the dose distribution mechanism and wherein repeated deviations from acceptable use of the medication-tracking device result in the central processor suggesting blocking of additional prescribing of the medication to the patient.

2. The medication-tracking device of claim 1 wherein the dose distribution mechanism is configurable to dispense a prescribed dose quantity from a plurality of possible dose quantities, wherein a user may dispense the prescribed dose quantity without restriction as to when or where the medication may be dispensed.

3. The medication-tracking device of claim 1 wherein the absolute location identification mechanism includes a GPS receiver.

4. The medication-tracking device of claim 1 wherein the communication mechanism communicates wirelessly.

5. The medication-tracking device of claim 1 wherein the communication mechanism communicates through a direct connection to the central processor.

6. The device of claim 1 wherein the dose distribution mechanism includes status-aware, tamper-evident, individually accessible compartments.

7. A medication-tracking system comprising:

a medication-tracking device comprising:

a storage mechanism adapted to securely store a plurality of doses of a medication prescribed to a patient, wherein the patient may access the entire plurality of doses of the medication without restriction as to when or where the medication may be accessed, even in a manner inconsistent with lawful compliance to a prescribed regimen;

a dose distribution mechanism adapted to dispense a dose of the medication;

a time identification mechanism adapted to identify the time for which the dose distribution mechanism dispenses a dose of the medication;

an absolute location identification mechanism adapted to identify the absolute location at which the dose distribution mechanism dispenses a dose of the medication;

a relative location identification mechanism adapted to identify the relative location of the patient with respect to the dose distribution mechanism at the time the dose distribution mechanism dispenses a dose of the medication; and a communication mechanism adapted to automatically report the time and absolute location information identified by the time and absolute location identification mechanisms, wherein the communication mechanism and the absolute location identification mechanism are triggered to report when a dose of the medication is dispensed from the dose distribution mechanism; and a central processor distinct from the medication-tracking device, wherein the central processor receives the time and absolute location information reported by the medication-tracking device and wherein repeated deviations from acceptable use of the medication-tracking device result in the central processor suggesting blocking of additional prescribing of the medication to the patient.

8. The medication-tracking system of claim 7 further including an associated device, which is adapted to communicate its position to either the medication-tracking device or the central processor.

9. The medication-tracking system of claim 8 wherein the associated device is a smartphone.

10. The medication-tracking system of claim 8 wherein the associated device is a location aware bracelet.

11. The medication-tracking system of claim 8 wherein the central processor identifies the distance between the medication-tracking device and the associated device at the time of each dose distribution.

12. The medication-tracking system of claim 8 wherein the medication-tracking device includes a biometric identification mechanism.

13. The medication-tracking system of claim 8 wherein the associated device includes a biometric identification mechanism.

14. The medication-tracking system of claim 7 wherein the medication-tracking device includes a plurality of mediation-tracking devices.

* * * * *